(12) United States Patent
Madsen

(10) Patent No.: US 11,469,442 B2
(45) Date of Patent: Oct. 11, 2022

(54) ENERGY STORAGE DEVICE

(71) Applicant: Dyson Technology Limited, Wiltshire (GB)

(72) Inventor: Alex Madsen, Swindon (GB)

(73) Assignee: Dyson Technology Limited, Malmesbury (GB)

( * ) Notice: Subject to any disclaimer, the term of this patent is extended or adjusted under 35 U.S.C. 154(b) by 105 days.

(21) Appl. No.: 16/494,865

(22) PCT Filed: Mar. 16, 2018

(86) PCT No.: PCT/GB2018/050693
§ 371 (c)(1),
(2) Date: Sep. 17, 2019

(87) PCT Pub. No.: WO2018/167513
PCT Pub. Date: Sep. 20, 2018

(65) Prior Publication Data
US 2020/0091546 A1    Mar. 19, 2020

(30) Foreign Application Priority Data
Mar. 17, 2017   (GB) ..................... 1704293

(51) Int. Cl.
*H01M 10/04*    (2006.01)
*H01M 10/613*   (2014.01)
*H01M 50/10*    (2021.01)

(52) U.S. Cl.
CPC ... *H01M 10/0468* (2013.01); *H01M 10/0422* (2013.01); *H01M 10/0431* (2013.01);
(Continued)

(58) Field of Classification Search
CPC .... H01M 50/10; H01M 50/531; H01M 10/04; H01M 10/613
See application file for complete search history.

(56) References Cited

U.S. PATENT DOCUMENTS

| 3,373,060 A | 3/1968 | Gray |
| 3,395,043 A | 7/1968 | Shoeld |

(Continued)

FOREIGN PATENT DOCUMENTS

| CN | 1588688 A | 3/2005 |
| CN | 103443988 A | 12/2013 |

(Continued)

OTHER PUBLICATIONS

International Search Report and Written Opinion dated May 30, 2018, directed to International Application No. PCT/GB2018/050693; 13 pages.

(Continued)

*Primary Examiner* — Kenneth J Douyette
(74) *Attorney, Agent, or Firm* — Faegre Drinker Biddle & Reath LLP

(57) ABSTRACT

An energy storage device comprising: a container, a mandrel, at least one sheet of separator material, and two or more electrodes. The container comprises a base and an inner surface forming an internal space. The mandrel is positioned in the container and is spaced apart from the inner surface to define a cavity within the container. The sheet of separator material is arranged about the mandrel to provide a plurality of discrete separator layers within the cavity. At least one electrode is provided between each of the discrete separator layers, and at least a portion of an external surface of a container has a curved profile.

7 Claims, 4 Drawing Sheets

(52) U.S. Cl.
CPC ..... *H01M 10/0459* (2013.01); *H01M 10/613* (2015.04); *H01M 50/10* (2021.01)

(56) References Cited

U.S. PATENT DOCUMENTS

| | | | |
|---|---|---|---|
| 3,897,266 A | 7/1975 | Devitt et al. | |
| 4,158,300 A | 6/1979 | Hug et al. | |
| 4,212,179 A | 7/1980 | Juergens | |
| 5,323,527 A * | 6/1994 | Ribordy | H01M 6/10 29/623.1 |
| 5,521,021 A * | 5/1996 | Alexandres | H01M 10/0431 429/54 |
| 6,287,719 B1 | 9/2001 | Bailey | |
| 6,485,859 B1 * | 11/2002 | Szyszkowski | H01M 4/78 429/66 |
| 7,811,697 B2 | 10/2010 | Hyung et al. | |
| 8,129,048 B2 | 3/2012 | Hirakawa et al. | |
| 9,136,557 B2 | 9/2015 | Bouvier | |
| 9,742,045 B2 | 8/2017 | Chami et al. | |
| 2001/0036571 A1 | 11/2001 | Oogami et al. | |
| 2002/0160257 A1 | 10/2002 | Lee et al. | |
| 2003/0077506 A1 | 4/2003 | Michel et al. | |
| 2003/0091893 A1 | 5/2003 | Kishiyama et al. | |
| 2003/0162086 A1 | 8/2003 | Longhi, Jr. et al. | |
| 2006/0121339 A1 | 6/2006 | Woo et al. | |
| 2006/0222943 A1 | 10/2006 | Fujikawa et al. | |
| 2009/0061304 A1 | 3/2009 | Muraoka et al. | |
| 2009/0077794 A1 | 3/2009 | Hirakawa et al. | |
| 2009/0123833 A1 | 5/2009 | Mao et al. | |
| 2011/0104572 A1 | 5/2011 | Ahn et al. | |
| 2011/0217586 A1 | 9/2011 | Kim et al. | |
| 2011/0229747 A1 | 9/2011 | Mitani et al. | |
| 2012/0164494 A1 | 6/2012 | Schaefer et al. | |
| 2012/0328922 A1 | 12/2012 | Bonhomme et al. | |
| 2013/0004817 A1 | 1/2013 | Lee et al. | |
| 2013/0288115 A1 * | 10/2013 | Nidelkoff | H01M 10/0587 429/208 |
| 2013/0344363 A1 | 12/2013 | Upadhyaya | |
| 2014/0011076 A1 | 1/2014 | Kanemoto et al. | |
| 2014/0038027 A1 | 2/2014 | Kanemoto et al. | |
| 2014/0045052 A1 | 2/2014 | Kim | |
| 2014/0082930 A1 | 3/2014 | Bouvier | |
| 2014/0099525 A1 * | 4/2014 | Kwon | H01M 50/40 429/94 |
| 2014/0349158 A1 | 11/2014 | Kanemoto et al. | |
| 2020/0020894 A1 | 1/2020 | Madsen | |
| 2020/0091545 A1 | 3/2020 | Madsen | |
| 2020/0099086 A1 | 3/2020 | Madsen | |

FOREIGN PATENT DOCUMENTS

| | | |
|---|---|---|
| CN | 103733384 A | 4/2014 |
| CN | 103765665 A | 4/2014 |
| CN | 103782438 A | 5/2014 |
| CN | 104137318 A | 11/2014 |
| DE | 102012018040 | 3/2014 |
| DE | 102012018040 A1 | 3/2014 |
| EP | 0797849 B1 | 11/2003 |
| EP | 1768202 A1 | 3/2007 |
| EP | 1348237 | 8/2011 |
| EP | 2693523 A2 | 2/2014 |
| EP | 2693553 A2 | 2/2014 |
| EP | 2696429 | 2/2014 |
| EP | 2757624 A1 | 7/2014 |
| JP | 08-083595 A | 3/1996 |
| JP | 11-086877 A | 3/1999 |
| JP | H11-73941 A | 3/1999 |
| JP | H11-204130 A | 7/1999 |
| JP | 2000-156241 | 6/2000 |
| JP | 2002-246278 A | 8/2002 |
| JP | 2003-529944 A | 10/2003 |
| JP | 2006-4792 A | 1/2006 |
| JP | 2006-313737 A | 11/2006 |
| JP | 2009-533833 A | 9/2009 |
| JP | 2011-198562 A | 10/2011 |
| JP | 2014-2836 A | 1/2014 |
| JP | 2014-036020 A | 2/2014 |
| JP | 2014-519166 A | 8/2014 |
| JP | 2015-002086 A | 1/2015 |
| JP | 2015-008092 A | 1/2015 |
| JP | 2015-141789 A | 8/2015 |
| JP | 2016-42433 A | 3/2016 |
| JP | 2016-519401 A | 6/2016 |
| KR | 10-0250163 B1 | 3/2000 |
| KR | 10-2006-0103028 | 9/2006 |
| KR | 10-2007-0065301 A | 6/2007 |
| KR | 10-2008-0036250 A | 4/2008 |
| KR | 10-2009-0110469 A | 10/2009 |
| KR | 10-2010-0137290 A | 12/2010 |
| WO | 02/45190 A1 | 6/2002 |
| WO | 2007/097172 A1 | 8/2007 |
| WO | 2012/133233 A1 | 10/2012 |
| WO | 2013/038946 A1 | 3/2013 |
| WO | 2016/050329 A1 | 4/2016 |

OTHER PUBLICATIONS

Search Report dated Sep. 21, 2017, directed to GB Application No. 1704293.8; 1 page.
Notice of Reasons for Rejection dated Jul. 27, 2020, directed to JP Application No. 2019-550576; 9 pages.
Notification of Reason for Refusal dated Jan. 6, 2021, directed to KR Application No. 10-2019-7028480; 10 pages.
International Search Report and Written Opinion received for PCT Patent Application No. PCT/GB2018/050691, dated Jun. 1, 2018, 11 pages.
International Search Report and Written Opinion received for PCT Patent Application No. PCT/GB2018/050692, dated May 29, 2018, 9 pages.
International Search Report and Written Opinion received for PCT Patent Application No. PCT/GB2018/050694, dated May 30, 2018, 9 pages.
Notice of Reasons for Rejection dated Apr. 19, 2021, directed to JP Application No. 2019-550741; 9 pages.
Notice of Reasons for Rejection dated Aug. 17, 2020, directed to JP Application No. 2019-550854; 7 pages.
Notice of Reasons for Rejection dated Aug. 3, 2020, directed to JP Application No. 2019-550741; 13 pages.
Notice of Reasons for Rejection dated Sep. 7, 2020, directed to JP Application No. 2019-550842; 8 pages.
Notification of Reason for Refusal dated Jan. 6, 2021, directed to KR Application No. 10-2019-7028478; 13 pages.
Notification of Reason for Refusal dated Jan. 6, 2021, directed to KR Application No. 10-2019-7028479; 10 pages.
Notification of Reason for Refusal dated Jan. 6, 2021, directed to KR Application No. 10-2019-7028481; 12 pages.
Office Action received for Japanese Patent Application No. 2019-550842, dated Jun. 7, 2021, 6 pages (3 pages of English Translation and 3 pages of Original Document).
Office Action received for Korean Patent Application No. 10-2019-7028478, dated Jul. 8, 2021, 10 pages (5 pages of English Translation and 5 pages of Original Document).
Office Action received for Korean Patent Application No. 10-2019-7028479, dated Jul. 8, 2021, 9 pages (5 pages of English Translation and 4 pages of Original Document).
Office Action received for Korean Patent Application No. 10-2019-7028480, dated Jul. 8, 2021, 8 pages (4 pages of English Translation and 4 pages of Original Document).
Office Action received for Korean Patent Application No. 10-2019-7028481, dated Jul. 8, 2021, 10 pages (5 pages of English Translation and 5 pages of Original Document).
Search Report dated Sep. 21, 2017, directed to GB Application No. 1704292.0; 1 page.
Search Report dated Sep. 21, 2017, directed to GB Application No. 1704294.6; 1 page.
Search Report dated Sep. 21, 2017, directed to GB Application No. 1704295.3; 1 page.

(56) References Cited

OTHER PUBLICATIONS

Office Action received for Chinese Patent Application No. 201880018914.7, dated Mar. 14, 2022, 22 pages (13 pages of English Translation and 9 pages of Original Document).

Office Action received for Chinese Patent Application No. 201880018955.6, dated Mar. 14, 2021, 23 pages (13 pages of English Translation and 10 pages of Original Document).

Office Action received for European Application No. 18714056.1, dated Feb. 5, 2021, 5 pages.

Office Action received for Chinese Patent Application No. 201880018923.6, dated Mar. 14, 2022, 26 pages (16 pages of English Translation and 10 pages of Original Document).

Office Action received for Chinese Patent Application No. 201880018923.6, dated Sep. 6, 2021, 15 pages (6 pages of English Translation and 9 pages of Original Document).

Office Action received for European Application No. 18714054.6, dated Feb. 5, 2021, 6 pages.

Office Action received for Chinese Patent Application No. 201880019128.9, dated Jun. 28, 2022, 17 pages (10 pages of English Translation and 7 pages of Original Document).

\* cited by examiner

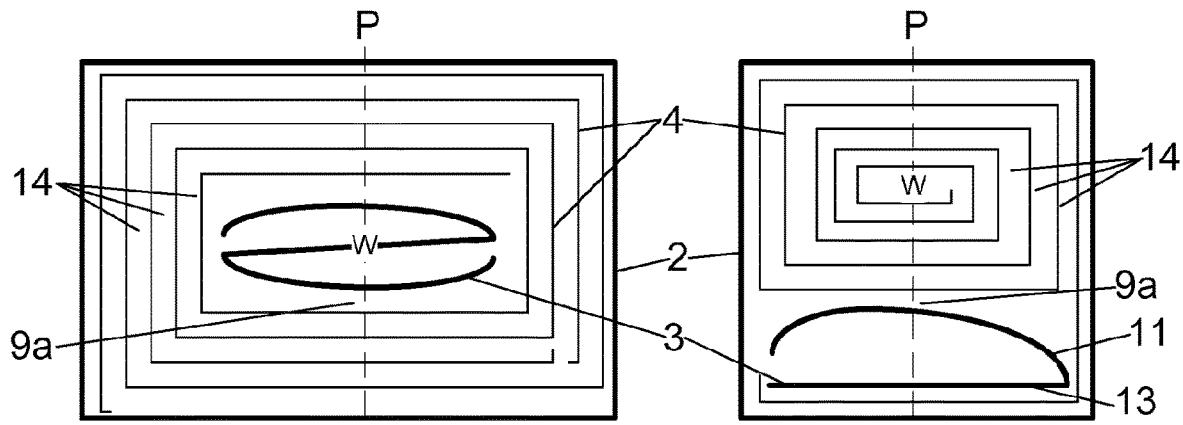
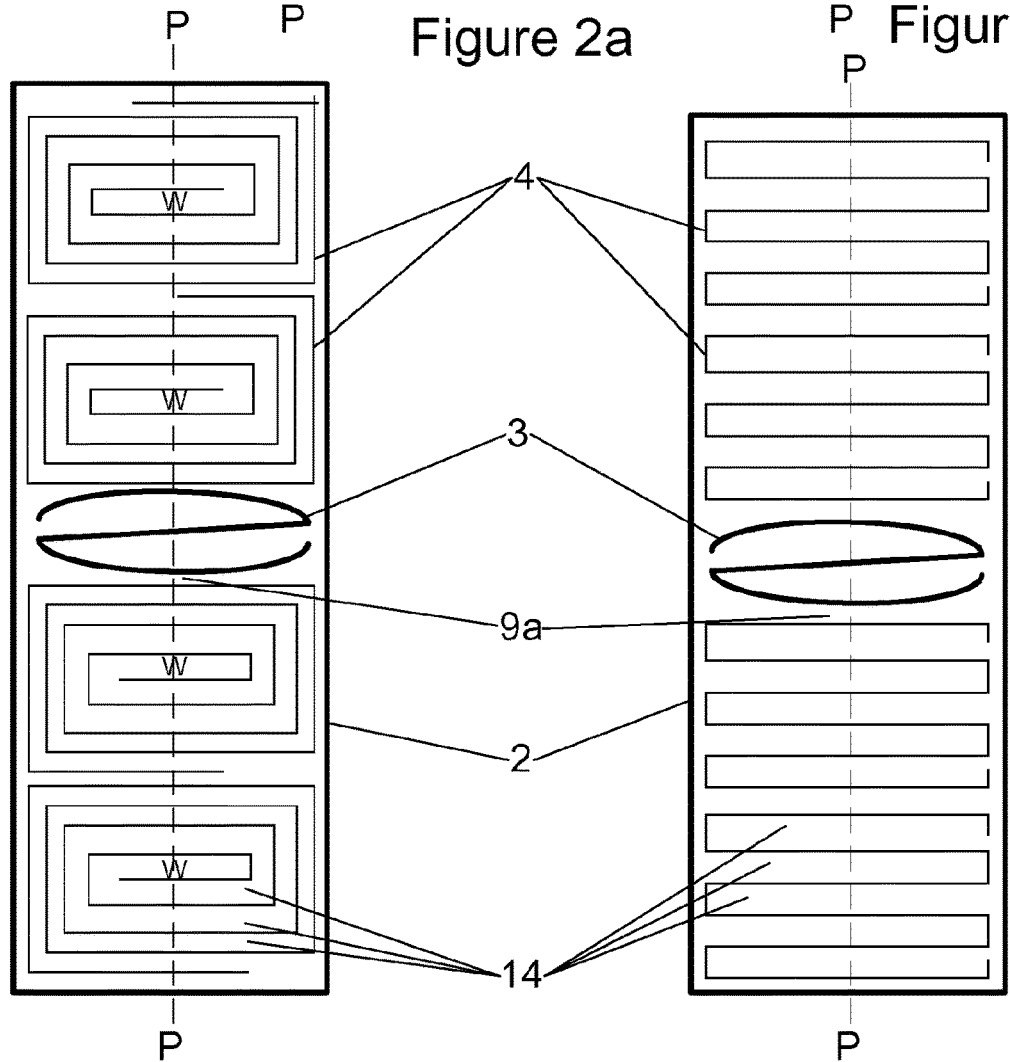
Figure 2a  Figure 2b
Figure 2c  Figure 2d

ENERGY STORAGE DEVICE

REFERENCE TO RELATED APPLICATIONS

This application is a national stage application under 35 USC 371 of International Application No. PCT/GB2018/050693, filed Mar. 16, 2018, which claims the priority of United Kingdom Application No. 1704293.8, filed Mar. 17, 2017, the entire contents of each of which are incorporated herein by reference.

FIELD OF THE INVENTION

This invention relates to a container for an energy storage device. More specifically, the present invention relates to a container for electrochemical cells.

BACKGROUND OF THE INVENTION

Electrochemical cells housed within energy storage devices comprise reactive and hazardous materials that require careful packing to ensure product safety. The packing should contain the hazardous material and also accommodate for changes in temperature and volume of the material as the cells charge and discharge. As well as having a desired robustness, the packaging is also required to have a low weight and volumetric efficiency, so as not to diminish the overall energy density of the energy storage device. The packing and design of the packaging should also avoid adding any unnecessary resistance gains to energy storage device.

Progress in energy storage technology has produced electrochemical cells with an increased energy density. This can lead to higher operating temperatures and large volume changes of active materials during a charge/discharge cycle compared to conventional electrochemical cells. Conventional packaging of energy storage may not be able to safely and efficiently accommodate cells with increased energy density.

SUMMARY OF THE INVENTION

According to some embodiments of the present invention, there is provided an energy storage device comprising: a container, a mandrel, at least one sheet of separator material, and two or more discrete electrodes, the container comprising a base and an inner surface forming an internal space; the mandrel is positioned in the container, and the mandrel and the inner surface are spaced apart to define a cavity within the container; the sheet of separator material is arranged about the mandrel to provide a plurality of discrete separator layers within the cavity, and wherein at least one electrode is provided to occupy the space between each of the discrete separator layers, and at least a portion of an external surface of a container has a curved profile.

Embodiments of the present invention provide a high energy density electrochemical storage device that can tessellate with other similar devices when combined in an array, whilst also having an external surface that would have reduced contact with adjacent energy storage devices when in an array. Although this would reduce the overall energy density of the array, the void between devices caused by the curved portion of the external surface allows for a cooling fluid to flow between devices and draw away any excess heat from the device during a charge/discharge.

The combination of discrete electrode sheets and a compressible mandrel of embodiments of the present invention allows for a cell comprising a stack of efficiently connected high energy density electrodes stored within a resilient protective container, in contrast to typical wound cells that rely on a continuous sheet of anode/cathode electrode material wound within the separator material. As such the device may comprise two or more discrete positive electrodes and two of more discrete negative electrodes. During a charge and discharge cycle, the collection energy dense electrode material within each device is expected to produce an amount of heat that would need to be radiated away from the device. In addition, an air or fluid gap between devices allows for isolation in the event of thermal runaway of a device in an array.

The face of the mandrel may be curved. The curved face of the mandrel can provide a uniform stack pressure over the surface of the electrodes within the packaging. In addition, the mandrel can adapt its shape effectively to relieve any build-up of pressure during cell expansion. The mandrel can be shaped such that its surfaces are concentric with the curves of the internal surface of the container. Furthermore, the shape of the mandrel may also be concentric with the overall external shape of the container. Embodiments of the present invention do not rely on a component of the electrochemical cell to be wound around the mandrel, the mandrel main function is to support the separator material against the inner surfaces of the container by contracting or expanding according to the electrode volume during a charge or discharge.

The mandrel may have a single surface and be circular or arced in shape, or in some embodiments, the mandrel may be shaped to have a second surface. For instance, the second surface of the mandrel may be curved such that the cross-sectional shape of the mandrel is elliptical. In some embodiments, the second mandrel surface may be flat and rest against another inner wall or surface of the container. In some embodiments, the second mandrel surface may contact the separator material to provide a compression force. The separator material contacting the second mandrel surface may be the same or different separator material that contacts the first mandrel surface.

The inner surface of the container may be curved, such that the container is generally cylindrical in shape. The mandrel may be positioned such that its longitudinal axis aligns with the longitudinal axis of the container. In some embodiments, the cavity is generally pipe shaped, and the separator material sheet(s) are wound around the mandrel to fill the cavity. The device in some embodiments is relatively easy to construct. However, due to the spiral of the separator material sheet(s) and the difference in size of each separator layer, the size of the electrodes increases along the packing axis away from the mandrel.

In some embodiments, the container may be shaped such that is comprises a second inner surface opposite the inner surface. For example, the container might be cube or cuboid in shape with opposite faces being curved. In some embodiments, the packing axis may pass through the container from the inner surface to the second inner surface, and the mandrel may be positioned along the packing axis to provide a second cavity. At the least one sheet of separator material may be arranged in the second cavity to provide a second plurality of separator layers along the packing axis, and the one or more electrodes are provided between the second separator layers. Having a generally cube or cuboid shaped container allows for the electrodes to be of a similar size. Furthermore, in some embodiments, the arrangement of the sheet(s) of separator material about the mandrel can take several forms. For example, a sheet of separator material can be wound about the mandrel, or a sheet of separator material could be folded in the cavity. When there is more than one cavity, at least one sheet of separator material may be provided in each cavity. Each cavity comprises at least one sheet of separator material. Furthermore, discrete rolls of separator material may be provided in each cavity. Having more than one sheet of separator material allows for different packing arrangements within the cavity/cavities and also means that damage of electrodes or separator material in one part of the device may be isolated.

The inner surface and/or the second inner surface of the container may be concave. By curving the surfaces which face the mandrel surfaces, a more uniform pressure can be applied to the cells within the cavities. This provides uniform pressure between the electrodes and the separator material and improves the efficiency of the cell.

BRIEF DESCRIPTION OF THE DRAWINGS

In order to better understand the present invention, and to show more clearly how embodiments of the invention may be put into effect, embodiments will now be described, by way of example, with reference to the following drawings:

FIGS. 2a-2d are schematics of separator material and mandrel within the energy storage device, according to some embodiments;

DETAILED DESCRIPTION OF THE INVENTION

Figure 1:
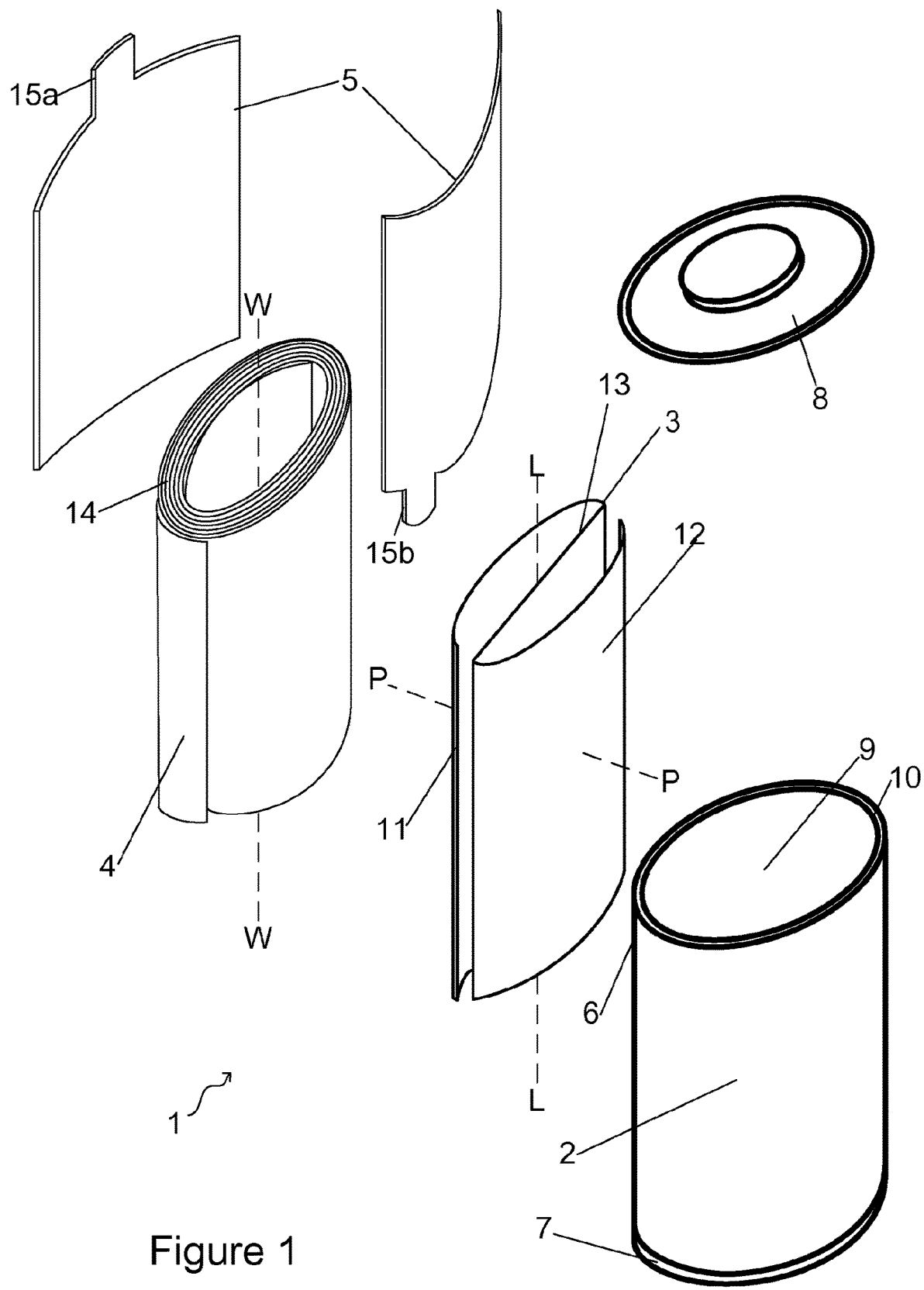
FIG. 1 is an exploded view of a schematic of an energy storage device of the present invention, according to some embodiments.

FIG. 1 shows an energy storage device 1 comprising a container 2, a compressible mandrel 3, separator material 4, and discrete electrodes 5. The container 2 has a casing 6, a base 7 and a cap 8 that together form the shell of the energy storage device 1. The casing 6 is formed of robust material to avoid external objects from piercing or rupturing the device 1. The casing 6 could be deep drawn/rolled/shaped and formed with the base 7 and cap 8 so as to form an internal space 9 for holding the electrochemical cell components, namely the compressible mandrel 3, separator material 4, and electrodes 5. The casing 6 has an inner surface 10 facing into the space 9. The base 7 and cap 8 are provided over the open ends of the casing 6 to enclose the electrochemical cell components 3, 4, 5 within the container 2. Although the base 7 and cap 8 are shown as separate parts from the casing 6, it is conceivable that the casing 6 may include, or be attached to, a preformed base 7 and cap 8.

The mandrel 3 has a first mandrel surface 11 and second mandrel surface 12 connected by an arm 13. The mandrel 3 is formed from a single piece of pliable material, such as a plastic or metal. The cross section of the mandrel 3 generally has the shape of an S and its outline is elliptical. The mandrel 3 has a longitudinal axis L which is normal to the S shape formed by the curved surfaces 11, 12 and the arm 13. The mandrel 3 extends along its longitudinal axis L such that it is similar in length to the container 2. The general cross-sectional shape of the mandrel 3 is the same along the entire length of its longitudinal axis L.

The mandrel 3 is formed so that it can be placed in the internal space 9 of the container 2. When the mandrel 3 is positioned within the internal space 9, a cavity 9a remains between the mandrel surfaces 11, 12 and the inner surface 10 of the container 2. Due to the shape of the mandrel 3, columns of hollow dead space exist between the mandrel surfaces 11, 12 and the arm 13 which extend along the longitudinal axis L. The hollow columns allow space for the mandrel 3 to collapse, as well as providing access for welding to at least part of the base 7 when the electrochemical cell components 3, 4, 5 are placed within the container 2.

The mandrel 3 is compressible in the direction of a packing axis P, which will be described in more detail in relation to the separator material 4. Generally speaking, the mandrel 3 can compress and/or deform such that the general elliptical shaped outline of its cross section decreases in size. The volume of the space 9 taken up by the mandrel 3 decreases as the mandrel 3 compresses. Furthermore, the mandrel surfaces 11, 12 can deform under extreme pressure such that the curvature or arc can change according to compression forces applied to the surface.

The separator material 4 as presented in FIG. 1 is a continuous sheet of electronically insulating porous material. The separator material 4 is rolled and positioned within the cavity 9a between the container 2 and the mandrel 3. The separator material 4 is wound around the mandrel 3 about a winding axis W which overlies the longitudinal axis L of the mandrel 3 when the electrochemical cell container 1 is in its complete form. As the sheet of separator material 4 is wound about winding axis W, layers of separator material are formed as the sheet rolls over itself. In the complete energy storage device 1, the separator material 4 is arranged in the container 2 to provide a plurality of separator layers placed along the packing axis P. This creates spaces 14 between layers of the separator material 4.

Electrodes 5 are positioned along the packing axis P within the spaces 14 of the wound separator material 4. For simplicity, only two electrodes 5 (one anode and one cathode along with the separator material 4 forming a cell) are shown in FIG. 1. However, an electrochemical cell container 1 of embodiments of the present invention may contain many electrodes 5, forming multiple electrochemical cells.

The electrodes 5 each comprise a tab 15a, 15b which can be secured to the internal surfaces of the base 7 and cap 8. By providing a tabs 15a, 15b on each electrode 5, the current path length for each electrode 5 is reduced and the internal resistance of the cell decreases.

As the cells charge/discharge, the electrodes 5 may expand and contract. As the electrodes 5 expand and occupy more volume within the internal space 9, the mandrel 3 compresses. Similarly, as the electrodes contract, the mandrel 3 expands to re-occupy the volume whilst also providing a constant compressive force along the packing axis P between the separator material 4 and the electrodes 5. The curved mandrel surfaces 11, 12 ensure that a uniform pressure over the surface of the electrodes 5 is maintained.

Various electrochemical cell container 1 arrangements that are within the scope of the present invention are shown schematically in FIGS. 2a-2d. The electrochemical cell containers 1 are shown in cross section along the longitudinal axis L of the mandrel 3, and without electrodes 5 for simplicity. Each electrochemical cell container 1 is shown in an over simplified manner as a squared container 2. However, it is appreciated that the separator material 4 would curve to occupy the internal space 9 of the container 2.

In FIG. 2a, two sheets of separator material 4 are wound about the mandrel 3. The mandrel 3 is positioned along the winding axis W of the separator materials 4. The sheets of the separator material 4 are concentric about the longitudinal axis L of the mandrel 3. A multitude of layers 14 is provided between the layers of the wound separator material 4 for housing electrodes 5. The electrodes 5 are arranged along the packing axis P.

In FIG. 2b, a mandrel 3 is provided with a single curved surface 11. The mandrel arm 13 rests against an internal surface 10 of the container 2. One sheet of separator material 4 is provided in the internal space 9 and is wound around a winding axis W. The winding axis W does not overlie the longitudinal axis L of the mandrel 3. Discrete layers 14 are provided in the roll of separator material 4 for housing electrodes. The electrodes 5 are arranged along the packing axis P.

FIGS. 2c and 2d illustrate embodiments of the present invention, where rolls or folds of separator material sheets 4 are positioned in the cavities 9a about the mandrel 3, the separator 4 is not wound about the mandrel 3. The device in FIG. 2c comprises two rolled sheets of separator material 4 in each cavity 9a. In FIG. 2d, the sheets of separator material 4 are folded in the cavity 9a. Electrodes 5 would be placed within the spiral or folds of the separator material 4. In these cases, the mandrel 3 is merely functioning to absorb expansion of the electrode 5 within the device 1, and not providing a bobbin for material 4, 5 to be wound around.

Figure 3A:
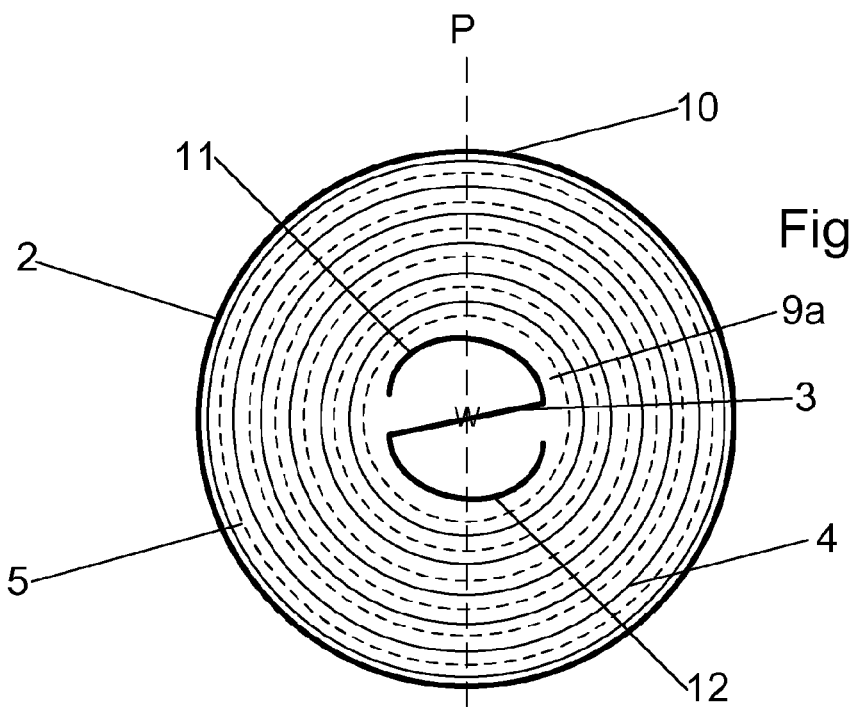
FIGS. 3a-3c are schematics of energy storage devices of the present invention, according to some embodiments.
Figure 3B:
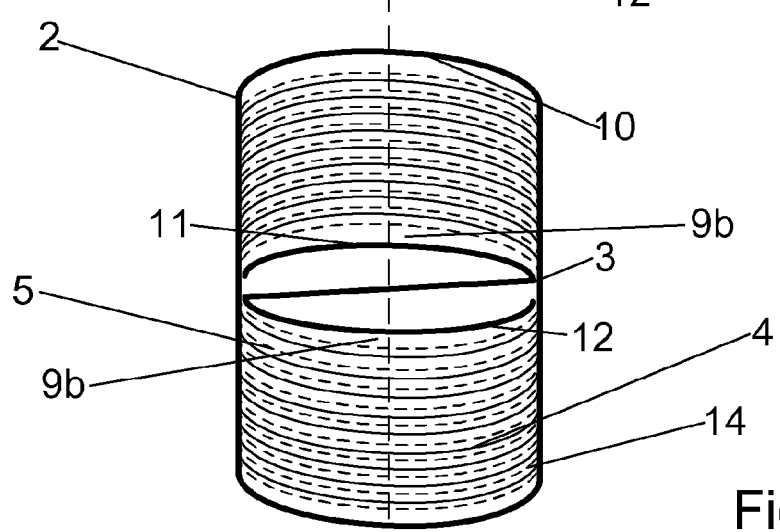
Figure 3C:
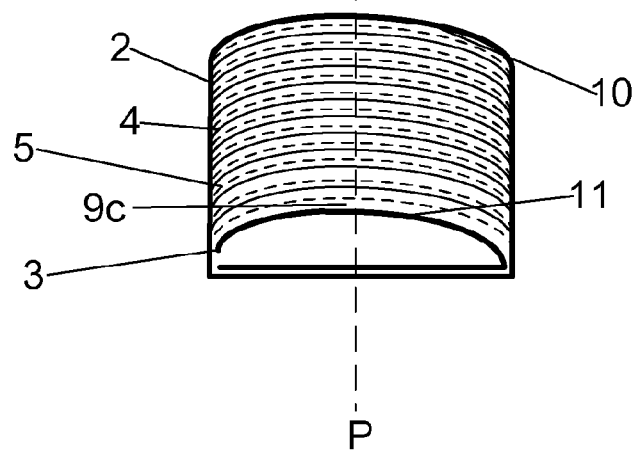

The container 2 in FIG. 1 is shown as cylindrical but could also form the shape of any prismatic cell. Cross-sectional schematics are shown in FIGS. 3a-3c of device 1. The layers of separator material 4 are shown as concentric rings instead of a continuous rolled sheet in the cavity 9a merely as a way of simplifying the drawing. Electrodes 5 are shown schematically as broken lines and can be positioned anywhere within the layers 14 between the rolled sheets of separator material 4. FIG. 3a shows a simplified cross sectional view of the complete device 1 of FIG. 1. The inner surface 10 is one continuous surface, and the mandrel surfaces 11, 12 face different regions of the same inner surface 10.

FIG. 3b illustrates a device 1 that has a generally cuboid shaped container 2, wherein the inner surfaces 10 facing the mandrel faces 11, 12 are concave. The separator material 4 is folded or wound so that fills the cavities 9b between the mandrel surfaces 11, 12 and the inner surface 10 of the container 2. The separator material 4 is arranged to provide layers 14 along the packing axis P, the layers being filled with electrodes 5. The curvature of the concave inner surface 10 similar to the curvature of the mandrel surfaces 11, 12 such that a uniform pressure is applied across the surface of the electrodes 5 within the layers 14 of separator material 4.

FIG. 3c illustrates a device 1 that has a generally cuboid shaped container 2, wherein the device 1 has only one cavity 9c which is filled with electrochemical cells. The inner surface 10 facing the mandrel face 11 is concave. The separator material 4 is folded or wound so that fills the cavity 9c between the mandrel surfaces 11, 12 and the inner surface 10 of the container 2. The separator material 4 is arranged to provide layers 14 along the packing axis P, the layers being filled with electrodes 5. The curvature of the concave inner surface 10 similar to the curvature of the mandrel surfaces 11, 12 such that a uniform pressure is applied across the surface of the electrodes 5 within the layers 14 of separator material 4.

In the examples shown in FIGS. 3a-3c, the curvature of the external casing matches the concave shape of the inner surfaces 10, the external casing may be flatted to provide an external cuboid shape. However, it may be beneficial to keep the curvature of the casing 6.

Figure 4A:
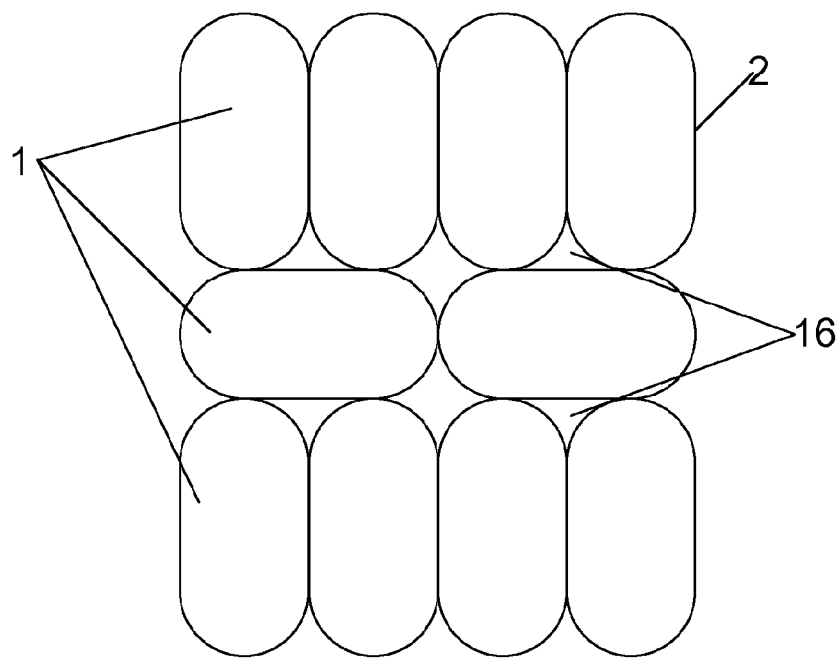
FIGS. 4a and 4b are schematics of arrays of alternative container shapes, according to some embodiments.
Figure 4B:
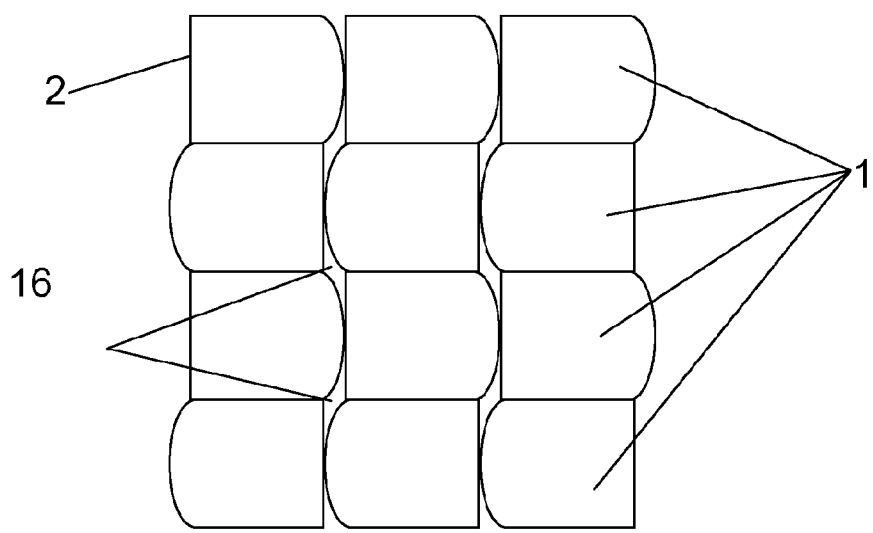

FIGS. 4a and 4b show an array of energy storage devices 1 according to FIGS. 3b and 3c respectively. The curvature of the casing 6 allows for gaps 16 between the containers 2 when arranged in an array. The curved casing 6 ensures that physical contact between adjacent containers 2 is reduced. A fluid such as air can be provided in the gaps 16 between the containers 2. The reduced contact between the containers 2 ensures that low heat transfer occurs between adjacent devices 1. In addition, fluid is free to flow over the array of containers and act as a coolant to remove any excess heat given off by the cells within the devices 1.

The invention claimed is:

1. An energy storage device comprising:
    a container comprising a base and an inner surface forming an internal space, the internal space having a first side and a second side opposite the first side;
    a mandrel positioned in the container at the first side away from the second side, wherein the mandrel and the inner surface are spaced apart to define a cavity within the container at the second side, the mandrel having a center longitudinal axis;
    at least one sheet of separator material arranged within the cavity wholly to provide a plurality of discrete separator layers, the plurality of discrete separator layers wounded about a winding axis separate from the center longitudinal axis such that the winding axis is positioned between the mandrel and the second side of the container; and
    a plurality of discrete electrodes comprising a plurality of discrete positive electrodes and a plurality of discrete negative electrodes,
    wherein the plurality of discrete electrodes occupies space between adjacent discrete separator layers of the plurality of discrete separator layers, and at least a portion of an external surface of the container has a curved profile.

2. The device of claim 1, wherein the mandrel comprises a first face that is curved.

3. The device of claim 2, wherein the mandrel comprises a second face.

4. The device of claim 3, wherein the second face of the mandrel is curved such that a cross-section of the mandrel has an elliptical shape.

5. The device of claim 4, wherein at least one wall of the container has a concave inner surface which is opposite the first face or the second face of the mandrel.

6. The device of claim 5, wherein the concave inner surface is formed due to the curved profile of the at least a portion of an external surface of the container.

7. The device of claim 6, wherein at least one of the first face and the second face of the mandrel is concentric with the curve of the internal surface of the container.

* * * * *